(12) United States Patent
Lee et al.

(10) Patent No.: US 12,449,586 B2
(45) Date of Patent: Oct. 21, 2025

(54) DISPLAY DEVICE INCLUDING FLEXIBLE LIGHT GUIDE AND STACK LAYER

(71) Applicant: E Ink Holdings Inc., Hsinchu (TW)

(72) Inventors: Kun-Hsien Lee, Hsinchu (TW); Ching-Huan Liao, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/909,854

(22) Filed: Oct. 8, 2024

(65) Prior Publication Data

US 2025/0028109 A1 Jan. 23, 2025

Related U.S. Application Data

(63) Continuation-in-part of application No. 18/341,767, filed on Jun. 27, 2023, now Pat. No. 12,196,998.

(60) Provisional application No. 63/419,302, filed on Oct. 25, 2022.

(30) Foreign Application Priority Data

Dec. 12, 2022 (TW) .................................. 111147549
Feb. 26, 2024 (TW) .................................. 113106728

(51) Int. Cl.
*F21V 8/00* (2006.01)
*G02F 1/1335* (2006.01)

(52) U.S. Cl.
CPC ......... *G02B 6/0088* (2013.01); *G02B 6/0033* (2013.01); *G02B 6/0053* (2013.01); *G02B 6/0065* (2013.01); *G02B 6/0066* (2013.01); *G02F 1/133616* (2021.01)

(58) Field of Classification Search
CPC ................ G02B 6/0053; G02B 6/0088; G02F 1/133616
See application file for complete search history.

(56) References Cited

U.S. PATENT DOCUMENTS

| 9,710,120 B2 | 7/2017 | Chang et al. |
| 11,885,952 B2 | 1/2024 | Chou et al. |
| 2011/0227487 A1* | 9/2011 | Nichol ................. G02B 6/0018 362/613 |
| 2011/0255303 A1* | 10/2011 | Nichol ................. G02B 6/0088 362/606 |

(Continued)

FOREIGN PATENT DOCUMENTS

| CN | 107250879 | 10/2020 |
| CN | 111542772 | 10/2022 |

*Primary Examiner* — Keith G. Delahoussaye
(74) *Attorney, Agent, or Firm* — JCIPRNET

(57) ABSTRACT

A display device including a display panel, a flexible light guide having a Young's modulus of about 10 to 1000 MPa, a light emitting element, and an optical layer is provided. The flexible light guide includes a light source portion, a light entrance portion, and a middle portion. The middle portion is bent, so that the light source portion and the light entrance portion are disposed at the opposite sides of the display panel. The light emitting element is disposed adjacent to the light entrance portion of the flexible light guide with a light emitting surface facing the side edge of the flexible light guide. The optical layer is in contact with a surface of the light source portion and a difference of refractive index between the flexible light guide and the optical layer is in a range of 0.1 to 0.2.

10 Claims, 3 Drawing Sheets

(56) References Cited

U.S. PATENT DOCUMENTS

2011/0277361 A1 11/2011 Nichol et al.
2018/0052274 A1 2/2018 Nichol et al.
2021/0337173 A1* 10/2021 Nichol ................. G02B 6/0076

* cited by examiner

DISPLAY DEVICE INCLUDING FLEXIBLE LIGHT GUIDE AND STACK LAYER

CROSS-REFERENCE TO RELATED APPLICATION

This application is a continuation-in-part application of and claims the priority benefit of a prior application Ser. No. 18/341,767, filed on Jun. 27, 2023, which claims the priority benefit of U.S. provisional application Ser. No. 63/419,302, filed on Oct. 25, 2022 and Taiwan application serial no. 111147549, filed on Dec. 12, 2022. This application claims the priority benefit of Taiwan application serial no. 113106728, filed on Feb. 26, 2024. The entirety of each of the above-mentioned patent applications is hereby incorporated by reference herein and made a part of this specification.

BACKGROUND

Technical Field

The disclosure relates to an electronic product, and in particular to a display device.

Description of Related Art

Large screens and narrow bezels are important directions for the design and development of many electronic products. In addition to minimizing the size of the circuit-related components placed in the peripheral non-display area, some product designs also manufacture the circuit-related components on the back side of the product. However, for front light source products, it is difficult to achieve narrow bezels because the light source was placed between the display panel and the user.

SUMMARY

The disclosure provides a display device that may realize a front light source type product with a narrow bezel.

The display device of the disclosure includes a display panel, a flexible light guide, a light emitting element, and an optical layer. The display panel has a display side and a back side opposite to the display side. The flexible light guide includes a light source portion, a light entrance portion, and a middle portion between the light source portion and the light entrance portion. The middle portion is bent by a bending radius of less than 1 mm so that the light source portion is disposed on the display side of the display panel, and the light entrance portion is disposed on the back side of the display panel. A Young's modulus of the flexible light guide is approximately 10 to 1000 MPa. The light emitting element is disposed adjacent to the light entrance portion of the flexible light guide. A light emitting surface of the light emitting element faces a side edge of the flexible light guide. The optical layer is disposed on and in contact with the surface of the light source portion of the flexible light guide. A difference of refractive index between the optical layer and the flexible light guide is in a range of 0.1 to 0.2.

In an embodiment of the disclosure, a thickness of the flexible light guide is 100 μm to 200 μm.

In an embodiment of the disclosure, a refractive index of the flexible light guide is greater than a refractive index of the optical layer.

In an embodiment of the disclosure, a storage modulus of the optical layer falls between 10 KPa and 60 KPa. The optical layer exposes the light entrance portion and the middle portion of the flexible light guide, and the thickness of the optical layer is, for example, 25 μm to 75 μm.

In an embodiment of the disclosure, the optical layer continuously covers the light source portion, the light entrance portion, and the middle portion of the flexible light guide, and the thickness of the optical layer is 5 μm to 25 μm. The display device may further include an adhesive layer, and the optical layer is disposed between the adhesive layer and the flexible light guide. The refractive index of the adhesive layer is, for example, greater than the refractive index of the optical layer.

In an embodiment of the disclosure, the optical layer has two layers and includes a first optical layer and a second optical layer. The first optical layer is disposed on a first surface of the light source portion of the flexible light guide. The second optical layer is disposed on a second surface of the light source portion of the flexible light guide. The first surface is opposite to the second surface.

In an embodiment of the disclosure, the display device further includes a stack layer. The flexible light guide and the optical layer are located between the stack layer and the display panel.

Based on the above, the display device according to the embodiment of the disclosure has a front light source composed of the flexible light guide and the light emitting element. The flexible light guide may be bent and partially disposed on the back side of the display panel, and the light emitting element is disposed on the back side of the display panel. In this way, the display device does not need to be provided with the light emitting element on the display side, thereby realizing a narrow bezel design. In addition, the optical layers may be disposed on both sides of the flexible light guide, and the difference of refractive index between the optical layer and the flexible light guide falls within the range of 0.1 to 0.2, which helps guide light to emit outward and improve light utilization efficiency.

DESCRIPTION OF THE EMBODIMENTS

Figure 1:
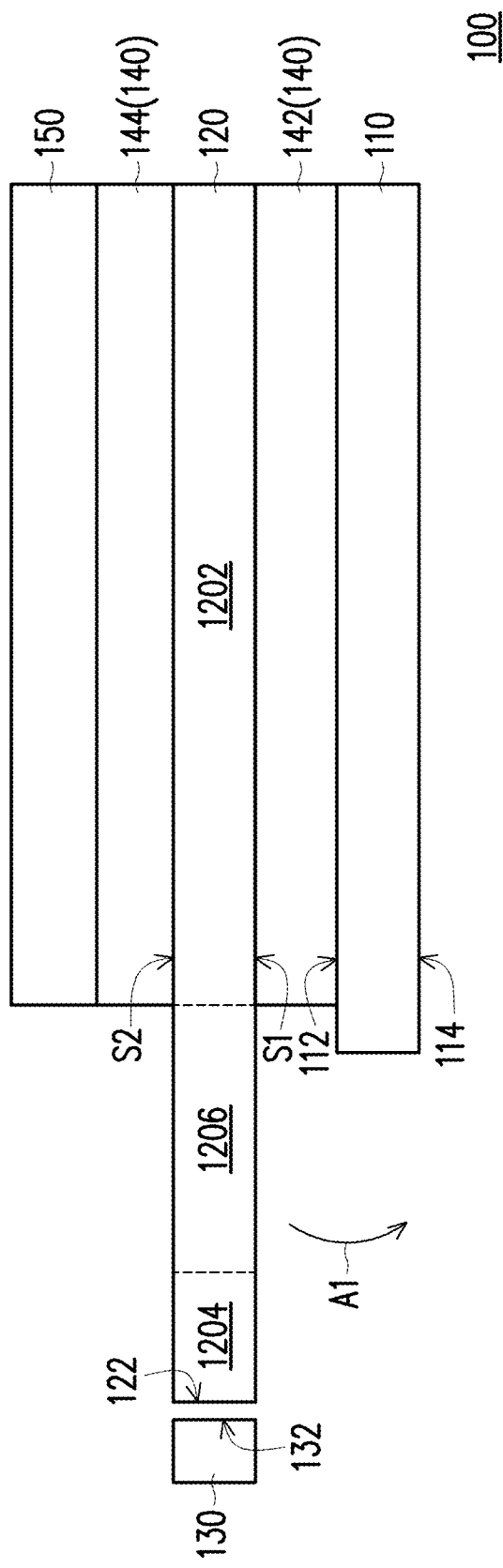
FIG. 1 is a schematic diagram of a display device according to an embodiment of the disclosure.

FIG. 1 is a schematic diagram of a display device according to an embodiment of the disclosure. In FIG. 1, a display device 100 basically includes a display panel 110, a flexible light guide 120, and a light emitting element 130. The display panel 110 has a display side 112 and a back side 114 opposite to the display side 112. The flexible light guide 120 is disposed on the display panel 110. The light emitting element 130 is disposed such that a light emitting surface 132 of the light emitting element 130 faces a side edge 122 of the flexible light guide 120. The flexible light guide 120 may guide a light emitted by the light emitting element 130 to the display side 112 of the display panel 110 and allow the light emitted by the light emitting element 130 to be emitted toward the display panel 110. The display panel 110 may be a reflective display panel, and the light irradiated toward the display panel 110 by the flexible light guide 120 may be reflected by the display panel 110 to provide a display image toward the user facing the display side 112. Therefore, the display device 100 is a front light source product. In some embodiments, the display panel 110 is, for example, an e-paper display panel.

In some embodiments, the flexible light guide 120 may include a light source portion 1202, a light entrance portion 1204, and a middle portion 1206 between the light source portion 1202 and the light entrance portion 1204. The size of the flexible light guide 120 is larger than the size of the display panel 110. The light source portion 1202, the light entrance portion 1204, and the middle portion 1206 may be distinguished according to the positional relationship between the flexible light guide 120 and the display panel 110. For example, the portion of the flexible light guide 120 located on the display side 112 of the display panel 110 and overlapping the display panel 110 in a thickness direction may be the light source portion 1202. The portion of the flexible light guide 120 that extends beyond the display panel 110 and is adjacent to the light-emitting element 130 may be the light entrance portion 1204. The portion of the flexible light guide 120 that extends beyond the display panel 110 and is located between the light entrance portion 1204 and the light source portion 1202 may be the middle portion 1206. The light source portion 1202, the light entrance portion 1204, and the middle portion 1206 are distinguished by relative positions, and there is no physical boundary between each other, but the disclosure is not limited thereto. In addition, the light source portion 1202 may be used to provide a light source for the display panel 110, so the light source portion 1202 may have multiple microstructures (such as dot structures) to distribute the light source.

A Young's modulus of the flexible light guide 120 is lower than 1000 MPa, for example, about 10 to 1000 MPa. In some embodiments, a material of the flexible light guide 120 may include thermoplastic polyurethane (TPU), polydimethylsiloxane (PDMS) or the like, but is not limited thereto. In addition, the thickness of the flexible light guide 120 is, for example, 100 μm to 200 μm. The light emitting element 130 includes, for example, a light emitting diode, which has a certain height (such as 400 μm to 600 μm). Therefore, the thickness of the flexible light guide 120 greater than 100 μm may allow the light of the light emitting element 130 to fully enter the flexible light guide 120 to have proper light utilization efficiency. In some embodiments, the light emitting element 130 may be a light bar including multiple light emitting diodes, but is not limited thereto.

In some embodiments, the flexible light guide 120 with a thickness of 100 μm to 200 μm is bendable. For example, the middle portion 1206 of the flexible light guide 120 may be bent in a direction of arrow A1 so that the light entrance portion 1204 is disposed on the back side 114 of the display panel 110. The light emitting element 130 adjacent to the light entrance portion 1204 of the flexible light guide 120 may be located on the back side 114 of the display panel 110, and the light emitting surface 132 of the light emitting element 130 remains facing the side edge 122 of the flexible light guide 120. In this way, the display device 100 does not need to reserve an installation area for the light emitting element 130 and may realize a narrow bezel design. In other words, the width of the bezel around the display area of the display device 100 may be smaller than the width of the light emitting element 130.

The display device 100 may further include an optical layer 140, and the optical layer 140 is disposed on and in contact with a surface of the light source portion 1202 of the flexible light guide 120. The optical layer 140 has two layers, for example. A difference of refractive index between each of the optical layers 140 and the flexible light guide 120 falls within a range of 0.1 to 0.2, for example. In some embodiments, the refractive index of the flexible light guide 120 may be less than 1.5. A storage modulus of each of the optical layers 140 may be less than 60 KPa, for example, between 10 KPa and 60 KPa, but is not limited thereto. In some embodiments, the material of the each of the optical layers 140 is, for example, silicone system optical glue, and the each of the optical layers 140 may also serve as an adhesive layer. In FIG. 1, the each of the optical layers 140 may expose the light entrance portion 1204 and the middle portion 1206 of the flexible light guide 120. The thickness of the each of the optical layers 140 is 25 μm to 75 μm. In other words, the each of the optical layers 140 may be disposed to overlap only the light source portion 1202 of the flexible light guide 120.

The optical layer 140 may include a first optical layer 142 and a second optical layer 144. The first optical layer 142 may be disposed on and in contact with a first surface S1 of the light source portion 1202 of the flexible light guide 120. The second optical layer 144 may be disposed on and in contact with a second surface S2 of the light source portion 1202 of the flexible light guide 120. The first surface S1 is opposite to the second surface S2. The first optical layer 142 may directly contact the flexible light guide 120 and the display panel 110 for attaching the flexible light guide 120 to the display side 112 of the display panel 110. In an embodiment, the optical layer 140 may be coated on the flexible light guide 120 by coating. In some embodiments, the display device 100 further includes an additional stack layer 150. The light source portion 1202 of the flexible light guide 120 and the two optical layers 140 (the first optical layer 142 and the second optical layer 144) are located between the stack layer 150 and the display panel 110. When the second optical layer 144 also serves as the adhesive layer, the stack layer 150 may be attached to the second surface S2 of the flexible light guide 120 through the second optical layer 144 in the optical layer 140. In some embodiments, the stack layer 150 may include a touch panel, a protective layer, a combination of the above two, or other layered components and any combination of the above two.

After the light emitted by the light emitting element 130 enters the flexible light guide 120, the light may pass through the light entrance portion 1204 and the middle portion 1206 inside the flexible light guide 120 and reach the light source portion 1202. In some embodiments, the refractive index of the flexible light guide 120 is greater than the refractive index of the each of the optical layers 140. Therefore, the light inside the flexible light guide 120 may travel away from the middle portion 1206 in the light source portion 1202. In some embodiments, the flexible light guide 120 may have scattered microstructures (such as dots) so that the light inside the flexible light guide 120 may partially leave the flexible light guide 120 at different positions of the light source portion 1202 to irradiate or irradiate away from the display panel 110. In some embodiments, the difference of refractive index between the each of the optical layers 140 and the flexible light guide 120 falls, for example, in the range of 0.1 to 0.2, which helps to control the total reflection at the interface between the each of the optical layers 140 and the flexible light guide 120. As a result, a sufficient amount of light is irradiated toward the display panel 110 as a display light source, which helps to optimize the display effect and the light utilization efficiency of the display device 100.

In some embodiments, when the thickness of the flexible light guide 120 is, for example, 150 μm, the refractive index of the flexible light guide 120 is, for example, about 1.51, and the refractive index of the each of the optical layers 140 is, for example, about 1.41, a distribution uniformity of the light provided by the light emitting element 130 in the light source area 1202 of the flexible light guide 120 may reach 80%. Here, the distribution uniformity may be estimated using a nine-point uniformity test method. For example, select 9 points in the display area (or active area) for detection, and the detected points includes the center point of the panel and additional eight points. The distance between the point closest to the edge and the edge of the display area is ⅙ of length/width of the display area. During detection, a light measuring instrument may be used to measure at the detection points in a direction perpendicular to the display device 100, so that the uniformity may be calculated from the detection results of each of the points. In addition, the brightness efficiency of the display device 100 may reach approximately 130 Nits/W. A contrast of a closed state of the display panel 110 may reach 19, and the contrast of an open state of the display panel 110 may reach 14.5. Overall, the brightness efficiency of the display device 100 can be improved and the display device 100 has optimized brightness uniformity.

Figure 2:
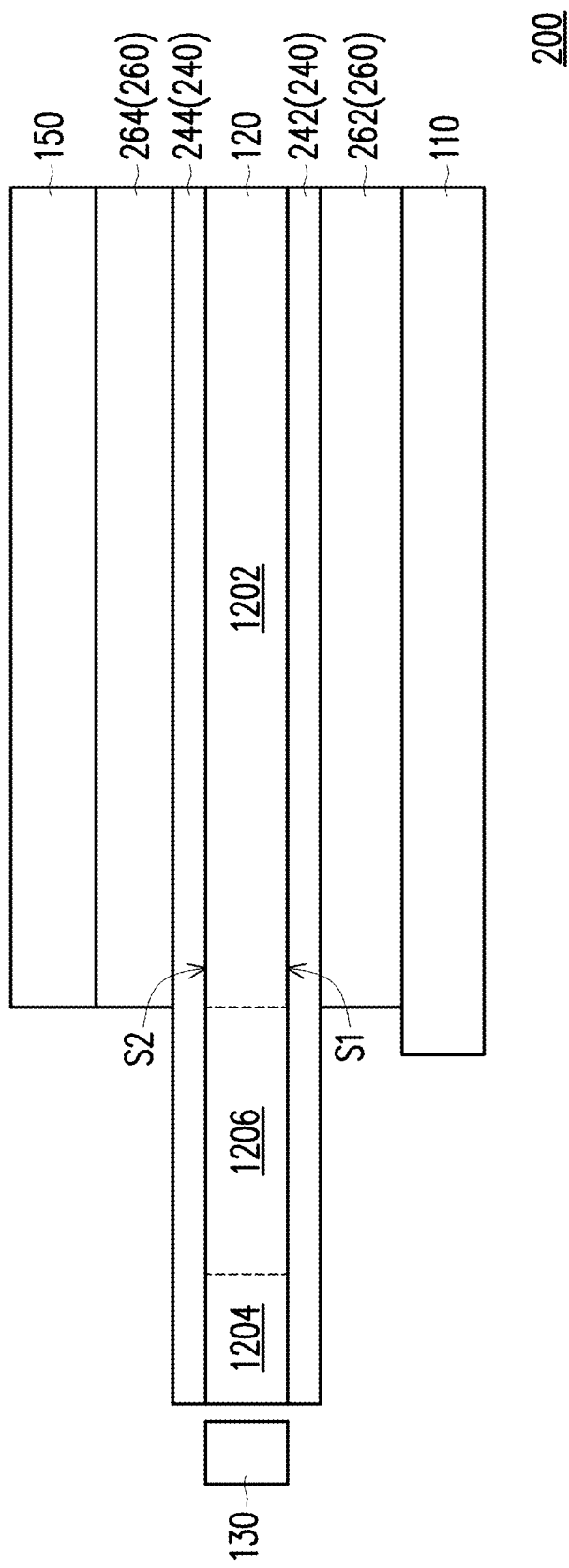
FIG. 2 is a schematic diagram of a display device according to an embodiment of the disclosure.

FIG. 2 is a schematic diagram of a display device according to an embodiment of the disclosure. In FIG. 2, a display device 200 is similar to the display device 100 in FIG. 1, and the elements represented by the same element numbers in the two embodiments may be referenced to each other. In other words, in FIG. 2, a structure, material, an arrangement position, properties, etc., of the display panel 110, the flexible light guide 120, the light emitting element 130, and the stack layer 150 of the display device 200 may refer to the relevant description of FIG. 1. In this embodiment, an optical layer 240 of the display device 200 is different from the optical layer 140 in FIG. 1. As shown in FIG. 2, the optical layer 240 continuously covers the light source portion 1202, the light entrance portion 1204, and the middle portion 1206 of the flexible light guide 120, and the thickness of the optical layer 240 is, for example, 5 μm to 25 μm. In addition, the display device 200 further includes an adhesive layer 260. The optical layer 240 is disposed between the adhesive layer 260 and the light source portion 1202 of the flexible light guide 120.

In this embodiment, the optical layer 240 has two layers, and the adhesive layer 260 also has two layers. The two optical layers 240 may be respectively a first optical layer 242 disposed on the first surface S1 of the light source portion 1202 of the flexible light guide 120 and a second optical layer 244 disposed on the second surface S2 of the light source portion 1202 of the flexible light guide 120. The two adhesive layers 260 may be a first adhesive layer 262 contacting the first optical layer 242 and a second adhesive layer 264 contacting the second optical layer 244. The first optical layer 242 and the second optical layer 244 may be made of the same material and may be formed on the surface of the flexible light guide 120 by coating, but the disclosure is not limited thereto. In some embodiments, the first optical layer 242 and the first adhesive layer 262 may be used in the display device 100 of FIG. 1 to replace the first optical layer 142, or the second optical layer 244 and the second adhesive layer 264 may be used in the display device 100 of FIG. 1 to replace the second optical layer 144.

In some embodiments, the difference of refractive index between the each of the optical layers 240 and the flexible light guide 120 may fall in the range of 0.1 to 0.2. The refractive index of the each of the optical layers 240 may be smaller than the refractive index of the flexible light guide 120. Therefore, the arrangement of the each of the optical layers 240 may allow the light traveling inside the flexible light guide 120 to partially exit the flexible light guide 120 at different locations. In addition, the refractive index of each of the adhesive layers 260 may be greater than the refractive index of the each of the optical layers 240 to allow light passing through the optical layer 240 to leave the optical layer 240 without being confined in the optical layer 240. In some embodiments, the material of the each of the adhesive layers 260 may include acrylic system optical glue, but is not limited thereto.

In some embodiments, the refractive index of the flexible light guide 120 is greater than the refractive index of the each of the adhesive layers 260. The refractive index of the each of the adhesive layers 260 is greater than the refractive index of the each of the optical layers 240. In some embodiments, when the thickness of the flexible light guide 120 is about 150 μm, the refractive index of the flexible light guide 120 is about 1.51, the refractive index of the each of the optical layers 240 is less than 1.40, and the refractive index of the each of the adhesive layers 260 is approximately 1.47, the distribution uniformity of the light provided by the light emitting element 130 in the light source area 1202 of the flexible light guide 120 may reach 80%. In addition, the brightness efficiency of the display device 100 may reach approximately 190 Nits/W. The contrast of the closed state of the display panel 110 may reach 20, and the contrast of the open state of the display panel 110 may reach 17.2.

Figure 3:
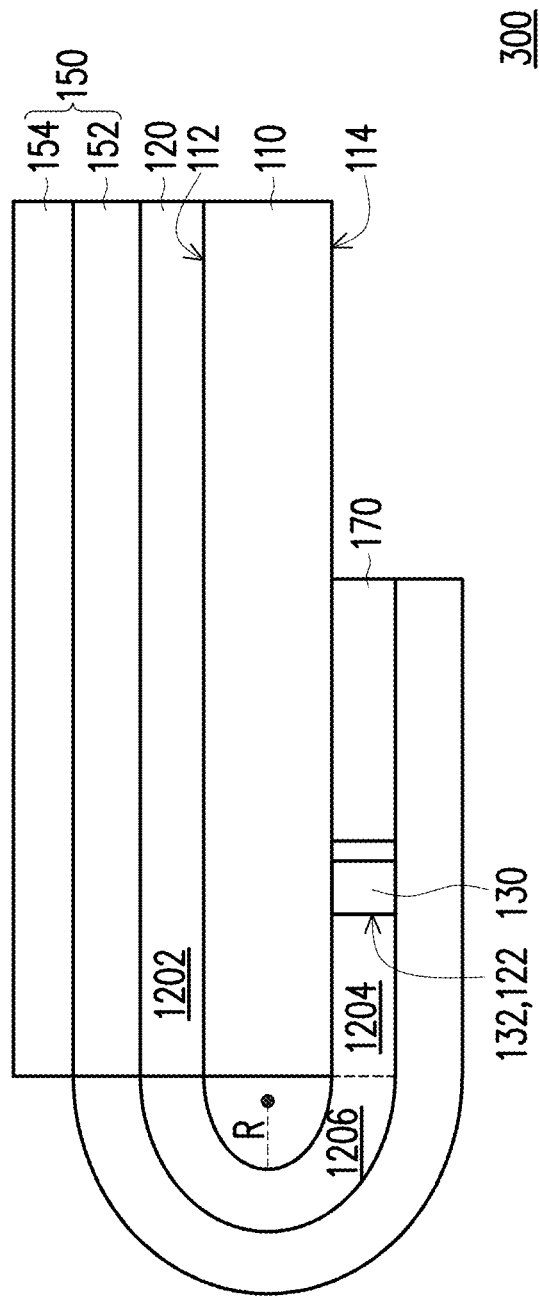
FIG. 3 is a schematic diagram of a display device according to an embodiment of the disclosure.

FIG. 3 is a schematic diagram of a display device according to an embodiment of the disclosure. For illustration, a display device 300 of FIG. 3 omits the optical layer 140 or the combination of the optical layer 240 and the adhesive layer 260 described in the previous embodiments. However, in specific examples of implementing the display device 300, the optical layer 140 or the combination of the optical layer 240 and the adhesive layer 260 described in the previous embodiments may be included. In some embodiments, the embodiment of FIG. 3 may be used to illustrate the state of the flexible light guide of the display device 100 of FIG. 1 or the display device 200 of FIG. 2 after being bent.

The display device 300 of FIG. 3 includes the display panel 110, the flexible light guide 120, the light emitting element 130, the stack layer 150, and an adhesive member 170. The configuration relationship of the display panel 110, the flexible light guide 120, the light emitting element 130, and the stack layer 150 may be referred to the description of FIG. 1 and FIG. 2, which is not repeated herein. The display panel 110 has the display side 112 and the back side 114 opposite to the display side 112. The flexible light guide 120 includes the light source portion 1202, the light entrance portion 1204, and the middle portion 1206 between the light source portion 1202 and the light entrance portion 1204. The Young's modulus of the flexible light guide 120 is approximately 10 to 1000 MPa, and the thickness of the flexible light guide 120 may be 100 to 200 μm.

The flexible light guide 120 is a bendable light guide plate. As shown in FIG. 3, the flexible light guide 120 is bent by a bending radius R of less than 1 mm, so that the light source portion 1202 is disposed on the display side 112 of the display panel 110, and the light entrance portion 1204 is disposed on the back side 114 of the display panel 110. At the same time, the light source portion 1202 is substantially parallel to the display side 112 of the display panel 110. The light emitting element 130 is further disposed on the back side 114 of the display panel 110 and is positioned such that the light emitting surface 132 faces the side edge 122 of the flexible light guide 120. The side edge 122 of the flexible light guide 120 may also be understood as the light entrance surface of the flexible light guide 120.

In some embodiments, the second optical layer 144 of FIG. 1 may be disposed between the stack layer 150 and the flexible light guide 120. The stack layer 150 may be attached to the flexible light guide 120 through the second optical layer 144 of FIG. 1. In some embodiments, the second adhesive layer 264 and the second optical layer 244 of FIG. 2 may be disposed between the stack layer 150 and the flexible light guide 120. The stack layer 150 may be attached to the flexible light guide 120 through the second adhesive layer 264 of FIG. 2. In this embodiment, the stack layer 150 may include a touch panel 152 and a protective layer 154. The light source portion 1202 of the flexible light guide 120 and the not-shown optical layers 140 and 240 (refer to FIGS. 1 and 2) are located between the protective layer 154 and the display panel 110. The flexible light guide 120 and the not-shown optical layers 140 and 240 (refer to FIGS. 1 and 2) are located between the touch panel 152 and the display panel 110. In addition, the touch panel 152 is located between the protective layer 154 and the flexible light guide 120. In other embodiments, the stack layer 150 may include one of the touch panel 152 and the protective layer 154. In some embodiments, the size of the touch panel 152 may be larger than the size of the display panel 110. The touch panel 152 has flexibility. The touch panel 152 may be further attached to the light entrance portion 1204 of the flexible light guide 120. A portion of the touch panel 152 may be bent to the back side 114 of the display panel 110 in compliance with the flexible light guide 120, and is fixed to the back side 114 of the display panel 110 through the adhesion of the adhesive member 170.

The touch panel 152 may include a support substrate, a touch electrode, a touch drive circuit, etc. (not shown), to provide a touch operation function. The protective layer 154 may be a transparent film that allows light to pass through. In some embodiments, the protective layer 154 may be an anti-glare film. In some embodiments, the protective layer 154 may be a film/sheet with moisture barrier and support force. In some embodiments, the protective layer 154 may be a composite layer of multiple film stacks.

The light emitting element 130, the touch drive circuit on the touch panel 152, etc., are all elements that affect the display screen. However, the flexible light guide 120 and the touch panel 152 may be bent, which allows the elements that obscure the display screen to be disposed on the back side 114 of the display panel 110. In this way, the display area of the display device 300 does not need to be limited by the elements that affect the display screen, so that the display area may be enlarged as much as possible with the narrow bezel design.

The bending state of the flexible light guide 120 in the display device 300 shown in FIG. 3 may be applied to the display device 100 of FIG. 1 and the display device 200 of FIG. 2. Therefore, the display device 100, the display device 200, and the display device 300 may dispose elements that cover the display area on the back side 114 of the display panel 110. In addition, the flexible light guide 120 is bent less than 1 mm, which helps to realize the narrow bezel design. As shown in the display device 100 of FIG. 1 and the display device 200 of FIG. 2, the optical layers 140/240 may be disposed on the opposite first surface S1 and the second surface S2 of the flexible light guide 120. The difference of refractive index of the flexible light guide 120 and the optical layers 140/240 falls between 0.1 and 0.2, which facilitates the transmittance of light in the flexible light guide 120 to optimize the light utilization efficiency and the brightness uniformity of the display devices 100/200/300. Although the optical layers 140/240 are not shown in FIG. 3, the display device 300 may also include the optical layer 140 of FIG. 1 or the combination of the optical layer 240 and the adhesive layer 260 of FIG. 2. In addition, the display device 100, the display device 200, and the display device 300 may be bendable flexible display devices. In addition to the flexible light guide 120, the optical layers 140/240, the display panel 110, and the stack layer 150 may all be made of bendable flexible material.

In addition, the display device 100, the display device 200, and the display device 300 may include or be connected to a display driving circuit (not shown) of the display panel 110. The display driving circuit may include a driving integrated circuit (or a driving IC) and a flexible circuit board that connects the driving IC to the display panel 110. The flexible circuit board of the display driving circuit may be bent so that the driving IC is located on the back side 114 of the display panel 110. In some embodiments, the flexible circuit board of the display driving circuit and the flexible light guide 120 may protrude from the same side of the display panel 110. However, in some embodiments, the flexible circuit board of the display driving circuit and the flexible light guide 120 may protrude from different sides of the display panel 110.

To sum up, the display device according to the embodiment of the disclosure has a flexible light guide. The flexible light guide may be bent to the back side of the display panel, allowing the light emitting element to be disposed on the back side, which facilitates the narrow bezel design. In some embodiments, the flexible light guide has a thickness corresponding to the light emitting element, which allows most of the light emitted by the light emitting element to enter the light guide, thereby improving the light utilization efficiency and achieving energy saving. In some embodiments, the display device includes the optical layer contacting the flexible light guide. The difference of refractive index between the flexible light guide and the optical layer falls in the range of 0.1 to 0.2, which helps ensure the transmittance of the light in the flexible light guide, optimizing light distribution uniformity.

What is claimed is:

1. A display device, comprising:
a display panel, having a display side and a back side opposite to the display side;
a flexible light guide, comprising a light source portion, a light entrance portion, and a middle portion between the light source portion and the light entrance portion, wherein the middle portion is bent by a bending radius of less than 1 mm so that the light source portion is disposed at the display side of the display panel, and the light entrance portion is disposed on the back side of the display panel, wherein a Young's modulus of the flexible light guide is about 10 to 1000 MPa;
a light emitting element, disposed adjacent to the light entrance portion of the flexible light guide, wherein a light emitting surface of the light emitting element faces a side edge of the flexible light guide; and
an optical layer, disposed on and in contact with a surface of the light source portion of the flexible light guide, wherein a difference of refractive index between the optical layer and the flexible light guide is in a range of 0.1 to 0.2,
wherein the optical layer exposes the light entrance portion and the middle portion of the flexible light guide.

2. The display device according to claim 1, wherein a thickness of the flexible light guide is 100 µm to 200 µm.

3. The display device according to claim 1, wherein a refractive index of the flexible light guide is greater than a refractive index of the optical layer.

4. The display device according to claim 1, wherein a storage modulus of the optical layer falls between 10 KPa and 60 KPa.

5. The display device according to claim 4, wherein a thickness of the optical layer is 25 µm to 75 µm.

6. The display device according to claim 1, wherein the optical layer covers the light source portion, and a thickness of the optical layer is 5 µm to 25 µm.

7. The display device according to claim 6, further comprising an adhesive layer, wherein the optical layer is disposed between the adhesive layer and the light source portion of the flexible light guide.

8. The display device according to claim 7, wherein a refractive index of the adhesive layer is greater than a refractive index of the optical layer.

9. The display device according to claim 1, wherein the optical layer has two layers and comprises a first optical layer and a second optical layer, the first optical layer is disposed on a first surface of the light source portion of the flexible light guide, and the second optical layer is disposed on a second surface of the light source portion of the flexible light guide, and the first surface is opposite to the second surface.

10. The display device according to claim 1, further comprising a stack layer, wherein the flexible light guide and the optical layer are located between the stack layer and the display panel.

* * * * *